United States Patent
Eichenseher et al.

(10) Patent No.: US 6,435,147 B1
(45) Date of Patent: Aug. 20, 2002

(54) CONTROL SYSTEM AND METHOD FOR OPERATING AN INTERNAL COMBUSTION ENGINE

(75) Inventors: Volker Eichenseher, Beratzhausen; Andreas Hartke, München; Thomas Vogt, Regensburg, all of (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/007,396

(22) Filed: Oct. 22, 2001

Related U.S. Application Data

(63) Continuation of application No. PCT/DE00/01118, filed on Apr. 11, 2000.

(30) Foreign Application Priority Data

Apr. 21, 1999 (DE) .......................... 199 18 094

(51) Int. Cl.⁷ .................................................. F01L 9/04
(52) U.S. Cl. ..................... 123/90.11; 123/479; 123/481
(58) Field of Search .............................. 123/90.11, 479, 123/481, 198 D, 198 F

(56) References Cited

U.S. PATENT DOCUMENTS

| | | | | |
|---|---|---|---|---|
| 5,190,013 A | * | 3/1993 | Dozier | ........................ 123/481 |
| 5,765,514 A | | 6/1998 | Sono et al. | ............... 123/90.11 |
| 6,178,934 B1 | * | 1/2001 | Hirasawa et al. | ........ 123/90.11 |
| 6,202,608 B1 | * | 3/2001 | Yamaki et al. | ........... 123/90.11 |
| 6,202,609 B1 | * | 3/2001 | Metz | ........................ 123/90.11 |
| 6,269,632 B1 | * | 8/2001 | Schmitz | ........................ 60/274 |

FOREIGN PATENT DOCUMENTS

| | | |
|---|---|---|
| DE | 29712502 U1 | 10/1997 |
| DE | 19733142 A1 | 2/1999 |
| EP | 0493634 A1 | 7/1992 |
| EP | 0724067 A1 | 7/1996 |
| EP | 0810350 A1 | 12/1997 |

OTHER PUBLICATIONS

"CAN Controller Area Network", Peter Bagschik et al., Hüthig Buch Verlag Heidelberg, pp. 34–44.

* cited by examiner

*Primary Examiner*—Weilun Lo
(74) *Attorney, Agent, or Firm*—Laurence A. Greenberg; Werner H. Stemer; Ralph E. Locher

(57) ABSTRACT

In order to avoid an undesired and damaging ignition in the case of the failure of a valve in an internal combustion engine with electromechanical valve drive, a control device interrupts the injection and/or the ignition for at least the cylinder in question when such a failure of a valve is detected by the control device.

15 Claims, 3 Drawing Sheets

CONTROL SYSTEM AND METHOD FOR OPERATING AN INTERNAL COMBUSTION ENGINE

CROSS-REFERENCE TO RELATED APPLICATION

This application is a continuation of copending International Application No. PCT/DE00/01118, filed Apr. 11, 2000, which designated the United States.

BACKGROUND OF THE INVENTION

FIELD OF THE INVENTION

The invention relates to a method and a control system for operating an internal combustion engine that takes in a mixture and has an intake tract, electromechanically activated charge cycle valves, an ignition system, and an injection system.

There exist prior art internal combustion engines whose charge cycle valves are activated electromechanically. In contrast to camshaft-activated valves, these valves are actuated so as to open and close as a function of the rotational position of the crankshaft; there is no fixed mechanical coupling to the crankshaft. Electromechanical final positioning elements of the charge cycle valves could have a different construction.

In European Patent Application 0 493 634 A1, corresponding to U.S. Pat. No. 5,072,700 to Kawamura, for example, charge cycle valves are described that are closed by a valve spring and opened by an electromagnet. The charge cycle valves disclosed in German Utility Model 297 19 502 U1, corresponding to U.S. Pat. No. 5,980,235 to Eppich et al. or European Patent Application 0 724 067 A1, corresponding to U.S. Pat. No. 5,752,478 to Sono et al. and U.S. Pat. No. 5,765,514 to Sono et al., have, in contrast, a position of rest that is located between a closed position and an open position and from which they can be deflected by electromagnets. Such configurations are referred to below as two-spring valves.

In order to open or close such a two-spring valve, the respective winding is energized, the necessary current being greater in the capture phase than in the holding phase in which the valve is held in an end position.

Whereas the control times in the operational control unit of the internal combustion engine are not predefined in conventional, camshaft-activated valve drive, it is necessary to calculate and predefine appropriate control times in the case of electromechanically activated valves.

Internal combustion engines with electromechanically activated valves, therefore, generally have, in addition to the normal operational control unit of the internal combustion engine, a control unit for the electromechanically activated valves, which control unit actuates the electromechanically activated valves based on the crankshaft position signal and the predefined values of the operational control unit.

In European Patent Application 0 493 634 A1, an electromagnetically activated auxiliary valve is provided in addition to the electromagnetically activated charge cycle valves. The auxiliary valve is located in parallel with the outlet valve and is opened before it to reduce the pressure against which the outlet valve has to open. All the valves have a closed position of rest. In the event of a failure, the auxiliary valve remains closed by virtue of its construction. The respective cylinder is, then, deactivated.

In the event of a failure of the electromechanical activation of a two-spring valve, which can take place, for example, as a result of (1) a failure of the final positioning element, (2) the output stage that actuates the final positioning element, or (3) a fault in the control unit and, under certain circumstances, only occurs briefly, the respective valve remains open, which is undesirable.

If such a failure occurs in an inlet valve, ignition into the intake manifold or into the intake tract may occur.

If such a failure occurs in an outlet valve, the ignition may occur in the exhaust tract and the emission control system may be damaged.

SUMMARY OF THE INVENTION

It is accordingly an object of the invention to provide a control system and method for operating an internal combustion engine that overcomes the hereinafore-mentioned disadvantages of the heretofore-known devices and methods of this general type and that has electromechanically activated charge cycle valves with a half-open position of rest so that, even in the event of a failure of an electromechanically activated charge cycle valve, an undesired ignition of fuel/air mixture into the intake tract or exhaust tract can be avoided.

With the foregoing and other objects in view, there is provided, in accordance with the invention, a control system for an internal combustion engine that receives a fuel/air mixture and has an intake tract, electromechanically activated charge cycle valves each having an open end position, a half-open position of rest, a closed end position, and two electromagnets selectively moving a charge cycle valve into the open end position and the closed end position and holding the charge cycle valve in a respective position, an ignition system, and an injection system, the control system including a control device for monitoring an operational capability of the charge cycle valves, the control device connected to the ignition system and the injection system and actuating the ignition system and the injection system, the control device programmed to prohibit an injection at the injection system and to prevent undesired ignition of the fuel/air mixture when a charge cycle valve exhibits a faulty function by either one of not closing and not closing completely, the control device having assemblies each programmed to detect the faulty it function of the charge cycle valves, OR elements each having, inputs, and an output connected to at least one of the injection and ignition systems for actuating at least one of the injection and ignition systems, and signal lines connecting each of the assemblies to an input of a respective one of the OR elements.

According to the invention, in the event of a failure of a charge cycle valve, as a result of which the charge cycle valve would remain open, the injection is suppressed and/or the ignition is shut down, for example, by intervention in the ignition coil. As a result, when a valve failure is detected, no combustible fuel/air mixture is generated or ignited, at least in the cylinder in question, as a result of which an undesired ignition into the outlet or exhaust tract is prevented.

The shutting down of the injection and the suppression of the ignition can be carried out for all cylinders, but is also possible on a cylinder-specific basis.

In accordance with another feature of the invention, the assemblies include travel controllers assigned to the charge cycle valves, and a valve control unit is connected to the travel controllers.

In accordance with a further feature of the invention, there is provided an operational control unit connected to each of the outputs of the OR elements and to at least one of the injection and ignition systems, each of the outputs of the OR elements indirectly intervening in at least one of the injection and ignition systems through the operational control unit.

In one advantageous refinement of the invention, a control unit for the electromechanically activated inlet valves signals a failure of a valve to the operational control unit of the internal combustion engine, which subsequently prohibits the injection and/or the ignition at least for the cylinder in question.

In accordance with an added feature of the invention, each of the outputs of the OR elements directly intervening in at least one of the injection and ignition systems.

In accordance with an additional feature of the invention, the injection system has a voltage supply, the ignition system has a voltage supply, a switch is connected to the voltage supply of the injection system and the voltage supply of the ignition system, and the control device is programmed to shut off, through the switch, the voltage supply of at least one of a part of the injection system, and a part of the ignition system.

In accordance with yet another feature of the invention, the internal combustion engine has cylinders each having one of the charge cycle valves, and when a charge cycle valve fails, the valve control unit is programmed to first prohibit at least one of the group consisting of injection at the injection system and ignition at the ignition system for all the cylinders and, at the same time, the valve control unit is programmed to output a message to the operational control unit to bypass an intervention of the valve control unit for at least one of the injection and ignition systems and to bring about a cylinder-specific shut-down of at least one of the injection and ignition systems, during which shut-down only a cylinder whose respective charge cycle valve fails is shut down.

With the objects of the invention in view, there is also provided a method of monitoring an operational capability of charge cycle valves of an internal combustion engine, including the steps of providing an internal combustion engine receiving a fuel/air mixture, monitoring an operational capability of the charge cycle valves with a control device, prohibiting an injection at the injection system with the control device to prevent undesired ignition of the fuel/air mixture when a charge cycle valve exhibits a faulty function by either one of not closing and of not closing completely, connecting assemblies of the control device to each input of a respective one of OR elements with a signal line, detecting the faulty function of each of the charge cycle valves with the assemblies, and actuating at least one of the injection and ignition systems with an output of the OR elements.

In accordance with yet a further mode of the invention, at least one of the injection and ignition systems is directly intervened or indirectly intervened via an operational control unit through an output of an OR element In accordance with yet an added mode of the invention, the control device shuts off a voltage supply of at least part of one of the injection and ignition systems by a switch.

In accordance with a concomitant mode of the invention, the valve control unit first prohibits at least one of an injection at the injection system and an ignition at the ignition system for all cylinders when a charge cycle valve fails, and, at the same time, the control device outputs a message to the operational control unit to bypass the intervention of the valve control unit in at least one of the injection and ignition systems and to bring about a cylinder-specific shut-down of at least one of the injection and ignition systems, during which shut-down only a cylinder whose charge cycle valve fails is shut down.

Other features that are considered as characteristic for the invention are set forth in the appended claims.

Although the invention is illustrated and described herein as embodied in a control system and method for operating an internal combustion engine, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
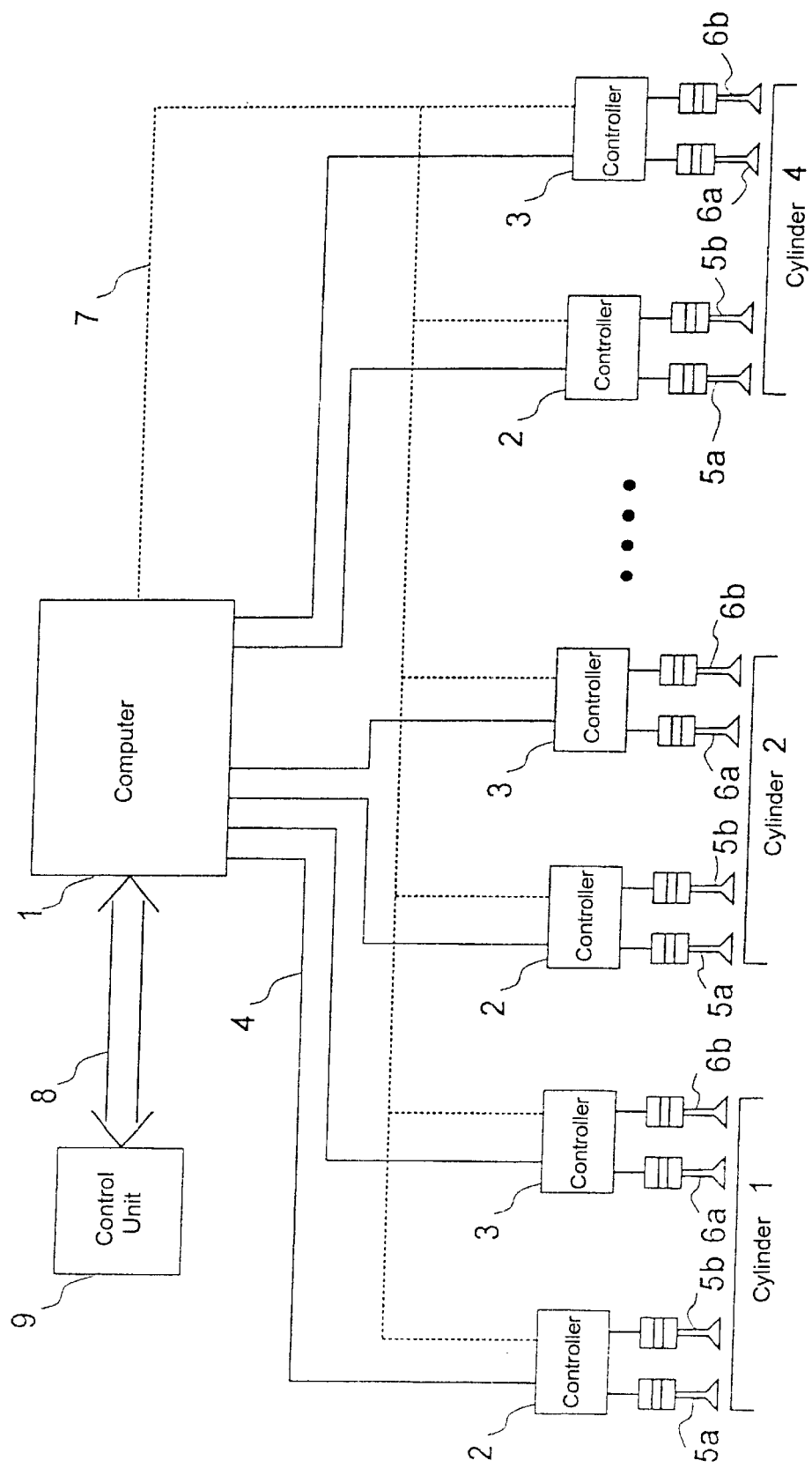
FIG. 1 is a block circuit diagram of a control circuit according to the invention for electromechanically activated charge cycle valves of a 4-cylinder internal combustion engine.

Referring now to the figures of the drawings in detail and first, particularly to FIG. 1 thereof, there is shown a circuit used to actuate electromechanically driven two-spring charge cycle valves 5a, 5b, 6a, 6b. Such an electromechanically driven two-spring charge cycle valve is described, for example, in the German Utility Model 297 12 502 U1. All that is essential to understand the invention is that the electromechanically activated charge cycle valve is activated by the energization of two coils, one coil being responsible for closing the charge cycle valve and the other for opening the charge cycle valve. The coils deflect the valve from a position of rest in which the valve is half open. The position of rest is preferably located in the vicinity of half the stroke of the valve.

FIG. 1 schematically illustrates the circuit of the valve control unit for a 4-cylinder internal combustion engine, but the number of cylinders is to be understood only by way of example. In the example, a cylinder has two inlet valves 5a, 5band two outlet valves 6a, 6b. In each case, a separate travel controller 2 and 3, respectively, is provided for the inlet and outlet valves 5a, 5b, and 6a, 6b, respectively. The travel controller 2, 3 actuates output stages that bring about the energization of the respective coils of the charge cycle valve 5a, 5b, 6a, 6b. Here, a separate output stage is provided, for example, for each coil. The travel controller 2, 3 and the output stages are accommodated in a housing that is connected to a non-illustrated coolant circuit of the internal combustion engine in order to ensure uniform conduction by way of heat.

The travel controller 2, 3 controls the output stages of a valve 5, 6 as a function of timing signals that indicate when the respective valve has to open or close. It outputs a separate timing signal for the inlet and outlet valves of each cylinder. In an internal combustion engine with more than two valves per cylinder, it is also possible to provide a separate timing signal for each cylinder.

The timing signals are fed to the travel controllers 2, 3 by a communication computer 1 through a unidirectional communications line 4. Each travel controller 2, 3 is connected through a further, serial SPI-BUS interface 7 to the communications computer 1 and signals the state of the valves 5a, 5b, 6a, 6b and/or possible failure of a valve through the interface.

The communications computer 1 is connected to a CAN-BUS 8 and communicates with the operational control unit 9 of the internal combustion engine through the CAN-BUS. Such a bus connection is described, for example, in W. Lawrenz, CAN-Controller Area Network, Huthig Verlag [publishing house], 1994, ISBN 3-7785-2263-7. The communications computer 1 is advantageously accommodated in the same cooled housing as the travel controllers 2, 3 and the output stages. Furthermore, the computer 1 receives the crankshaft signal and calculates from it, together with the requests of the operational control unit, the timing signals for the travel controllers 2, 3, and outputs the signals to the travel controllers 2, 3 through the unidirectional communications lines 4. The computer 1 additionally communicates with the travel controllers 2, 3, and exchanges the status information and/or fault information, through the SPI-BUS 7.

During the operation of an electromechanical valve it is possible that the valve does not open or close as desired. In particular, in the electromechanical final positioning element for the charge cycle valve that is disclosed in the German Utility Model 297 12 502 U1, the charge cycle valve may remain in the half-open or half-closed position of rest during the changeover from one end position to the other. By suitably activating the electromagnets, it is possible to excite the valve again out of such a position of rest and move it into the desired end position. However, the action requires a certain amount of time. Furthermore, a valve failure is possible if, for example, one of the output stages for the electromagnets, the actuation line, the travel controller 2, 3, or the communications line 4 exhibits a defect.

If such a valve failure occurred, it would result in the fuel/air mixture being ignited when the valve is not closed. In the case of an inlet valve 5a, 5b, there would be an ignition into the open intake tract of the internal combustion engine or of the cylinder in question. The same applies to the failure of an output valve 6a, 6b.

Figure 2:
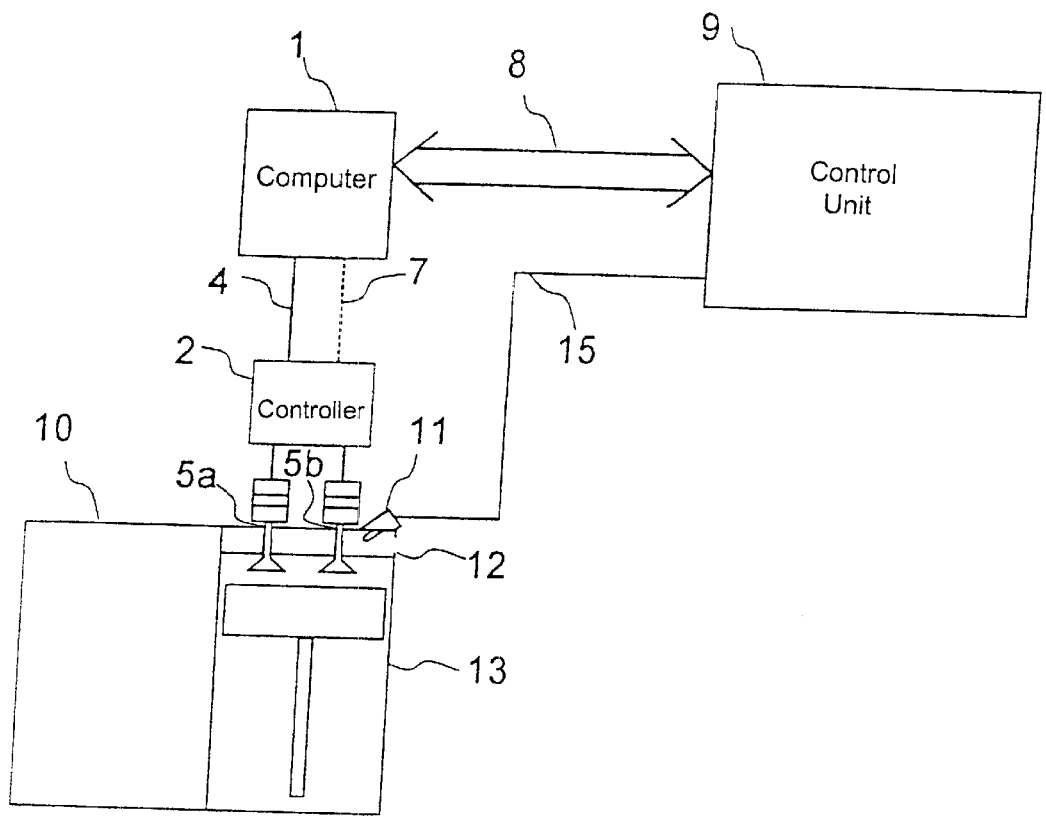
FIG. 2 is a block circuit diagram of the control circuit of FIG. 1 with an internal combustion engine having an injection system and electromechanical valve drive.

FIG. 2 illustrates these conditions more precisely in a schematic view, where the inlet valves 5a, 5bare shown for a cylinder 13 of an internal combustion engine 10, and an injection valve 11 by way of representation for the entire injection system. The injection valve 11 performs the injections into the intake tract 12 of the cylinder 13. The schematic view shows only one cylinder 13 of the internal combustion engine 10. Likewise, only the inlet valves 5a, 5bare illustrated, the outlet valves are not included in FIG. 2. Finally, of the injection system 11, only the injection valve is shown schematically, and, of course, the injection system 11 is generally somewhat more complex. The injection system can also be a direct injection system. The operational control unit 9 of the internal combustion engine actuates the injection system 11 through a control line 15.

Furthermore, for each cylinder 13 the internal combustion engine 10 has a non-illustrated spark plug, which is part of a non-illustrated ignition system with at least one ignition coil.

If the communications computer 1 detects a defect in the valve drive of the electromechanically activated inlet valve 5a, 5b, which leads to an electromechanically activated inlet valve 5a, 5b no longer closing completely, it signals the condition to the operational control unit 9 through the CAN-BUS 8.

The operational control unit 9 can react in two ways. It can suppress the ignition in the cylinder in question by an intervention in the ignition system. Alternatively, it can shut down the injection.

Because an intervention in the ignition system can generally be made in an ignition coil, the intervention being costly, the operational control unit 9 will preferably suitably actuate the ignition system 11 and interrupt the ignition only if an injection has already taken place at the time when a valve failure is detected.

For such a purpose, the operational control unit 9 causes the injection system 11, through the control line 15, not to perform any further injections into the intake tract 12 of the cylinder 13 in question. As a result, a fuel/air mixture that can be undesirably ignited is prevented from being generated in the cylinder 13 in question. Accordingly, an ignition into the intake tract 12 is made impossible.

Figure 3:
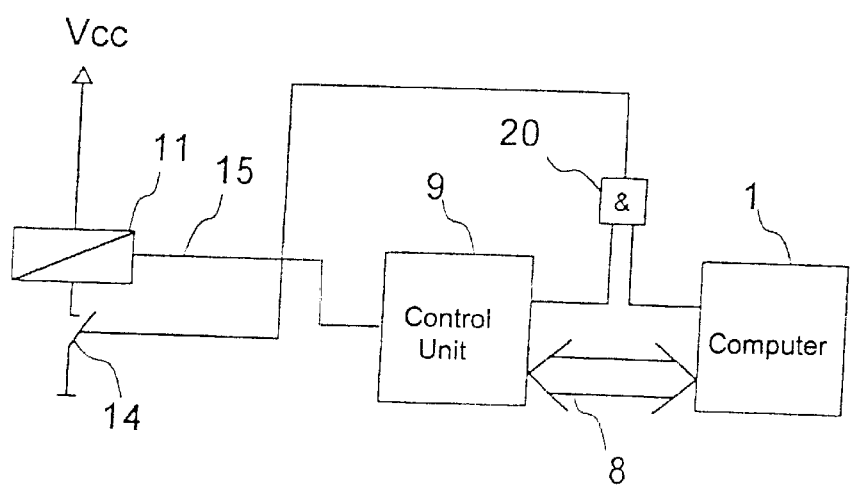
FIG. 3 is a schematic and block circuit diagram of a circuit between a valve control unit, an operational control unit, and an injection system according to the invention.

FIG. 3 illustrates a circuit of a preferred embodiment. The operational control unit 9 and the communications computer 1 of the electromagnetic valve control system each actuate an input of an AND element 20 whose output is connected to a switch 14 located in the power supply of the injection system 11. The communications computer 1 and the operational control unit 9 are, as already mentioned, also connected to a common CAN-BUS 8. Moreover, the operational control unit 9 has further possible ways of intervening in the injection system 11 through the control line 15. The operational control unit 9 usually issues instructions for the execution of injection through the control line 15, which can also be embodied as a bi-directional communications line. Given appropriately constructed injection systems 11, the injection can also be carried out on a cylinder-specific basis.

If both inputs of the AND element 20 are at a high level, the switch 14 in the power supply of the injection system 11 is opened. According to standard practice, the operational control unit 9 applies a high level to the one input of the AND element 20, and the communications computer 1 applies a low level. If the communications computer 1 detects a failure of one of the injection valves 5 of the internal combustion engine 10, it also applies a high level to the other input of the AND element 20. As a result, the switch 14 is opened and the power supply of the injection system 11 is disconnected. At the same time, the communications computer 1 signals, to the operational control unit 9 through the CAN-BUS 8, which valve has failed or which cylinder is affected by the failure. However, because the communication through the CAN-BUS generally takes place only over 180° crankshaft angle, the communication takes, together with the program running times in the communications computer 1 and the operational control unit 9, a set time until the operational control unit 9 is capable of configuring the injection through the control line 15 to the injection system 11 on a cylinder-specific basis such that injection does not occur at the cylinder 13 in question. If the operational control unit 9 is capable of effecting the cylinder-specific injection control of the injection system 11, it switches the high level at the input of the AND element 20 off, as a result, the switch 14 closes and the injection system is supplied with power again.

The operational control unit 9 then instructs the communications computer 1, through the CAN-BUS 8, not to apply any further high level to the input of the AND element 20. When such an instruction is taking place, the operational control unit 9 can, again, apply a high level to the input of the AND element without the switch 14 opening, as a result of which, the initial state would be reached.

The switch 14 advantageously disconnects only the supply voltage of the injection valves in the circuit in FIG. 3 so that such valves can no longer open. The rest of the injection system 11, in particular, possible control units, should, of course, continue to be supplied with power.

Figure 4:
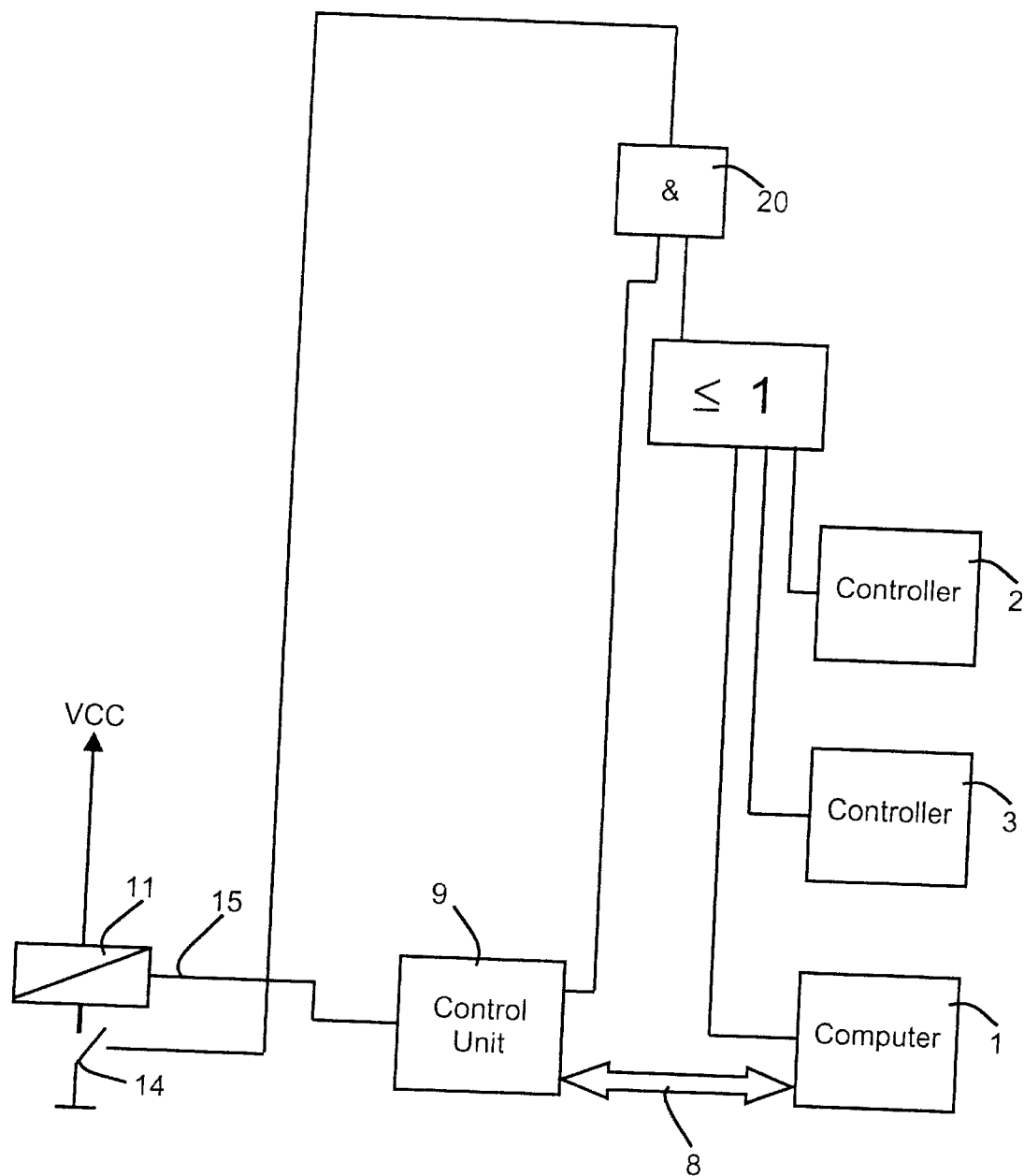
FIG. 4 is a schematic and block circuit diagram of an alternative embodiment of the circuit of FIG. 3.

Instead of connecting the communications computer 1 to the AND element 20 in the described way, it is, of course, also possible to connect corresponding outputs of the travel controllers 2, 3 and the output of the communications computer 1 to an OR element and to feed its output to the input of the AND element 20 as shown in FIG. 4. Such a connection makes any control of the valve control system capable of disconnecting the injection if it detects a valve failure. The configuration can be developed further such that all the assemblies that are capable of detecting a faulty function of a valve are connected to an appropriate OR signal line and coupled to the input of the AND element 20.

Finally, the connection to the AND element 20 can be disposed with and, instead, a direct access to the switch 14 in the power supply of the injection system 11 can be permitted by the communications computer 1.

An analogous circuit is also possible for intervention in the ignition system, in which case, it is also necessary additionally to take measures to protect the ignition coil against overvoltage and to discharge the ignition coil.

We claim:

1. A control system for an internal combustion engine that receives a fuel/air mixture and has:
    an intake tract;
    electromechanically activated charge cycle valves each having:
        an open end position;
        a half-open position of rest;
        a closed end position; and
        two electromagnets selectively moving a charge cycle valve into the open end position and the closed end position and holding the charge cycle valve in a respective position;
    an ignition system; and
    an injection system, the control system comprising:
        a control device for monitoring an operational capability of the charge cycle valves;
        said control device connected to the ignition system and the injection system and actuating the ignition system and the injection system;
        said control device programmed to prohibit an injection at the injection system and to prevent undesired ignition of the fuel/air mixture when a charge cycle valve exhibits a faulty function by either one of not closing and not closing completely;
        said control device having:
            assemblies each programmed to detect the faulty function of the charge cycle valves;
            OR elements each having:
                inputs; and
                an output connected to at least one of the injection and ignition systems for actuating at least one of the injection and ignition systems; and
            signal lines connecting each of said assemblies to an input of a respective one of said OR elements.

2. The control system according to claim 1, wherein:
    said assemblies include travel controllers assigned to the charge cycle valves; and
    a valve control unit is connected to said travel controllers.

3. The control system according to claim 2, including an operational control unit connected to each of said outputs of said OR elements and to at least one of the injection and ignition systems, each of said outputs of said OR elements indirectly intervening in at least one of the injection and ignition systems through said operational control unit.

4. The control system according to claim 2, wherein each of said outputs of said OR elements directly intervening in at least one of the injection and ignition systems.

5. The control system according to claim 2, wherein:
    the injection system has a voltage supply;
    the ignition system has a voltage supply;
    a switch is connected to the voltage supply of the injection system and the voltage supply of the ignition system; and
    said control device is programmed to shut off, through said switch, the voltage supply of at least one of:
        a part of the injection system; and
        a part of the ignition system.

6. The control system according to claim 3, wherein:
    the internal combustion engine has cylinders each having one of the charge cycle valves; and
    when a charge cycle valve fails, said valve control unit is programmed to first prohibit at least one of the group consisting of:
        injection at the injection system; and
        ignition at the ignition system,
    for all the cylinders and, at the same time, said valve control unit is programmed:
        to output a message to said operational control unit to bypass an intervention of said valve control unit for at least one of the injection and ignition systems; and
        to bring about a cylinder-specific shut-down of at least one of the injection and ignition systems, during which shut-down only a cylinder whose respective charge cycle valve fails is shut down.

7. A method of monitoring an operational capability of charge cycle valves of an internal combustion engine, which comprises:
    providing an internal combustion engine receiving a fuel/air mixture and having:
        an intake tract;
        electromechanically activated charge cycle valves each having:
            an open end position;
            a half-open position of rest;
            a closed end position; and
            two electromagnets selectively moving a charge cycle valve into the open end position and the closed end position and holding the charge cycle valve in a respective position;
        an ignition system; and
        an injection system;
    monitoring an operational capability of the charge cycle valves with a control device;
    prohibiting an injection at the injection system with the control device to prevent undesired ignition of the fuel/air mixture when a charge cycle valve exhibits a faulty function by either one of not closing and of not closing completely;
    connecting assemblies of the control device to each input of a respective one of OR elements with a signal line;

detecting the faulty function of each of the charge cycle valves with the assemblies; and actuating at least one of the injection and ignition systems with an output of the OR elements.

8. The method according to claim 7, wherein:

the assemblies include travel controllers assigned to the charge cycle valves; and a valve control unit is connected to the travel controllers.

9. The method according to claim 8, which further comprises directly intervening in at least one of the injection and ignition systems through an output of an OR element.

10. The method according to claim 8, which further comprises indirectly intervening in at least one of the injection and ignition systems through an output of an OR element via an operational control unit.

11. The method according to claim 8, which further comprises shutting off a voltage supply of at least part of one of the injection and ignition systems with the control device by a switch.

12. The method according to claim 9, which further comprises shutting off a voltage supply of at least part of one of the injection and ignition systems with the control device by a switch.

13. The method according to claim 10, which further comprises shutting off a voltage supply of at least part of one of the injection and ignition systems with the control device by a switch.

14. The method according to claim 10, which further comprises:

first prohibiting, with the valve control unit, at least one of an injection at the injection system and an ignition at the ignition system for all cylinders when a charge cycle valve fails; and at the same time, outputting, with the control device, a message to the operational control unit to bypass the intervention of the valve control unit in at least one of the injection and ignition systems and to bring about a cylinder-specific shut-down of at least one of the injection and ignition systems, during which shut-down only a cylinder whose charge cycle valve fails is shut down.

15. The method according to claim 8, which further comprises:

first prohibiting, with the valve control unit, at least one of an injection at the injection system and an ignition at the ignition system for all cylinders when a charge cycle valve fails; and at the same time, outputting, with the control device, a message to an operational control unit to bypass the intervention of the valve control unit in at least one of the injection and ignition systems and to bring about a cylinder-specific shut-down of at least one of the injection and ignition systems, during which shut-down only a cylinder whose charge cycle valve fails is shut down.

* * * * *